(12) United States Patent
Kawaguchi et al.

(10) Patent No.: US 7,231,049 B2
(45) Date of Patent: Jun. 12, 2007

(54) ELECTRONIC MAILING SYSTEM

(76) Inventors: Eiji Kawaguchi, 8-21-2 Hinosato, Munakata, Fukuoka 811-3425 (JP); Richard Eason, 595 Forest Ave., Orono, ME (US) 04473

( * ) Notice: Subject to any disclaimer, the term of this patent is extended or adjusted under 35 U.S.C. 154(b) by 777 days.

(21) Appl. No.: 10/308,372

(22) Filed: Dec. 3, 2002

(65) Prior Publication Data

US 2003/0142130 A1    Jul. 31, 2003

(51) Int. Cl.
*H04L 9/00* (2006.01)
(52) U.S. Cl. .................. 380/277; 380/278; 380/283; 380/54
(58) Field of Classification Search .............. None
See application file for complete search history.

(56) References Cited

U.S. PATENT DOCUMENTS 6,011,849 A * 1/2000 Orrin ..................... 380/42

6,304,897 B1 * 10/2001 Venkatraman et al. ...... 709/206

FOREIGN PATENT DOCUMENTS

WO    WO 0057613 A1 * 9/2000

* cited by examiner

*Primary Examiner*—Kim Vu
*Assistant Examiner*—Ponnoreay Pich
(74) *Attorney, Agent, or Firm*—Michael T. Persson; Lawson & Persson, P.C.

(57) ABSTRACT

An electronic mail system and method in which a message receiver creates an envelope containing envelope media data that is hidden with an embedding-and-extracting key. The message sender acquires the message receiver's envelope and, using an embedding-and-extracting key, embeds a secret message in the acquired envelope media data. The embedded envelope is sent to the message receiver, who extracts the secret message from the received embedded envelope using the same embedding-and-extracting key used to embed the data. As a result a secret message can be sent from the sender to the receiver without being eavesdropped on during the communication.

14 Claims, 9 Drawing Sheets

EC: Envelope creating subprogram

ME: Message embedding subprogram

EO: Envelope opening subprogram

ELECTRONIC MAILING SYSTEM

CLAIM OF PRIORITY

This application claims the benefit under 35 USC §119, based upon a prior filing in a state that is a member of the Paris Convention, of Japanese Patent Application No. 2001-363247, filed on Dec. 3, 2001.

FIELD OF THE INVENTION

The present invention relates to the field of electronic mailing systems that utilize envelope media data that is embedded with a secret message and is sent out as an attachment.

BACKGROUND OF THE INVENTION

With the advent of the information age, it has become quite common for people to use electronic mail for message exchange; even in a case the message is very secret. In the meantime current electronic mailing systems are far from being safe because one engaged in a computer networking operation can easily eavesdrop on the communication by intercepting the messages. The only method to make an electronic mailing message secure is to use a cryptography method, i.e., the sender encrypts the sending message and the receiver decrypts the received message.

However, introducing an encryption-and-decryption method to an electronic mailing system creates the two important difficulties. Firstly, in the case where a symmetric key is used, it is necessary for the message sender and the message receiver to negotiate about the key they use before they start mailing. Such negotiation must be done in a very secret manner. This process, however, takes a significantly long time and needs considerable effort. Especially, when the sender and the receiver are not acquainted beforehand, the confidential negotiation is almost impossible.

Secondly, in the case where an asymmetric key is used, a message sender primarily needs to consult an authentication bureau to obtain the legitimate public key of the message receiver. This procedure also requires not only some time and effort, but also incurs some cost on the message sender's side, even if such a bureau is operated publicly.

Therefore there is a need for an electronic mailing system wherein a message sender can send a message anonymously and covertly, and in a symmetric key system a message sender and a message receiver need not negotiate about a key they use before they start mailing thereby negating the need for significant lengths of time and considerable effort, and in an asymmetric key system a message sender need not consult an authentication bureau to obtain the legitimate public key of the message receiver.

SUMMARY OF THE INVENTION

The system of the present invention includes a means for a message receiver to create an "envelope" that includes envelope media data into which an embedding-and-extracting key is hidden. The envelope media data may be image data, acoustic data, or other multimedia data that is commonly sent as attachments to electronic mail messages.

Once the receiver creates the envelope, it is obtained by a message sender, who may download it from an Intranet, or Internet Web site, or receive it as part of an electronic mail message from the message receiver. Once obtained, the message sender uses an embedding means to embed a secret message into the envelope media data using the embedding-and-extracting key hidden within the envelope media data. The embedding may, for example, be executed according to a bit-plane decomposition based steganography, such as that disclosed in the inventors' U.S. Pat. No. 6,473,516, which is incorporated herein by reference. The message sender does not see what key is actually used and how it works when embedding, and this key is automatically removed from the envelope media data after embedding.

The message sender sends out the envelope media data through an electronic network system as an electronic mail attachment, the message receiver receives the envelope media data and then uses an extracting means that uses the embedding-and-extracting key to extract the secret message.

There are at least two major differences between an Anonymous Covert Electronic Mailing System (ACEMS) and a symmetric-key based cryptographic electronic mailing system:

(1) In a cryptographic system a key-negotiation is needed in advance, while no negotiation is needed for an ACEMS; and (2) In a cryptographic system, key-handling processes at the message sender and the receiver's site are needed in a case by case manner, while in an ACEMS no key-handling process is needed on either site.

ACEMS is also unlike an asymmetric cryptographic electronic mailing system. In an asymmetric cryptography system, an established authentication bureau is needed for public-key authentication and distribution. Currently, businesses handle such authentication, requiring time and money from a message sender. ACEMS minimizes both time and money needed to send a secret message because it needs no such bureau. An ACEMS does not need any authentication as an ACEMS-Envelope has its owner-name, i.e., the designated message receiver's name, and the electronic mailing address, i.e., the message receiver's designated address, shown on the outside of the envelope media data. Each envelope must be sent to the designated receiver according to the designated address.

Each ACEMS-Envelope is embedded according to a steganographic algorithm, which is generally very fragile, or some other fragile algorithm. A fragile algorithm means that once someone tries to tamper with the envelope, e.g., tries to change the designated message receiver's name and address, the hidden key and the optional information are easily destroyed; i.e., become unable to embed a secret message in the envelope. Therefore, no one can successfully tamper with an ACEMS-Envelope.

For example, even if someone, A, tries to impersonate another person, B, by creating an envelope in which A's key is hidden in the envelope but having B's name and address on the outside of the envelope, no secret message will be sent to A, because every such envelope is addressed to B and may only be sent to B.

If A can intercept an envelope embedded with a secret message from C to B, A cannot open the envelope because A does not have B's key. In any case, a secret message is only sent to the designated message receiver without third party eavesdropping. Therefore, there is no merit in attempting to forge an envelope or impersonate another person.

Therefore, it is an aspect of the invention to provide an electronic mailing system wherein a message sender can send a message anonymously and covertly.

It is a further aspect of the invention to provide a mailing system that if using a symmetric key system, a message sender and a message receiver need not negotiate about a key they use before they start mailing, such that significant lengths of time and considerable effort are not required.

It is a still further aspect of the invention to provide a mailing system that if using an asymmetric key system, a message sender need not consult an authentication bureau to obtain the legitimate public key of the message receiver.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE INVENTION

Figure 1:
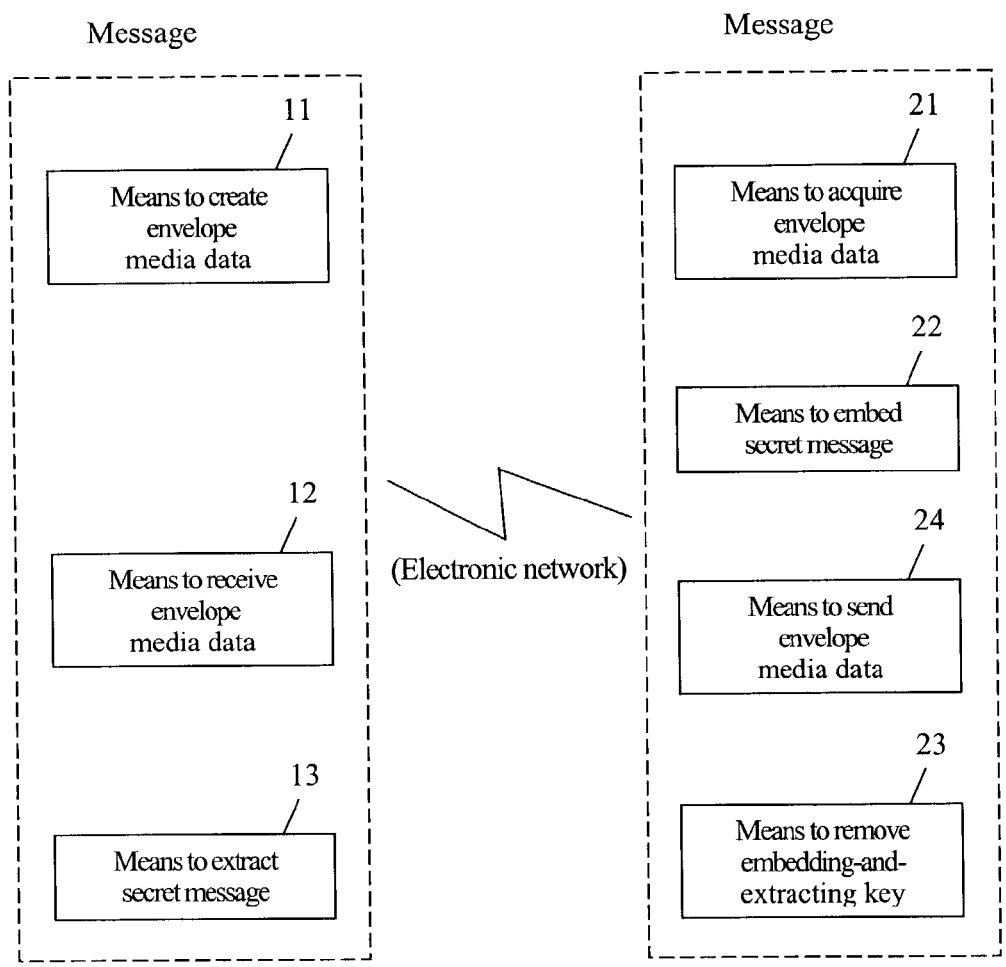
FIG. 1 is a view of the respective means on the message sender's side and the message receiver's side according to the present invention.

Referring first to FIG. 1, one embodiment of the system of the present invention contains an envelope creation means 11 for creating an envelope that includes envelope media data, having sufficient data-hiding capacity to cover the data amount of the secret message to be embedded by the sender, and an embedding-and-extracting key hidden within the envelope media data. The envelope media data is commonly referred to as either "cover data" or "dummy data" in the art and may be image data, acoustic data, or other multimedia data that is commonly sent as attachments to electronic mail messages.

An acquisition means 21 is provided for a message sender to acquire the envelope. As noted above, this may be an Internet or Intranet page where the envelope may be downloaded, or an electronic mail message, sent to the sender, that includes the envelope. It is noted that in some systems, such as those used by governmental or large corporate agencies, the envelopes may be included as part of the electronic mail data accessed by each user as part of the mail system and, accordingly, the means 21 will not be part of the system.

An embedding means 22 is provided for a message sender to embed a secret message using the embedding-and-extracting key in the acquired envelope. This means is described in detail below.

The embodiment of FIG. 1 also includes a sending means 24 for a message sender to send an envelope media data that is embedded with a secret message by way of an electronic network system, such as an Internet, Intranet, LAN or other communication network systems, and a receiving means 12 for a message receiver to receive the envelope media data. These means 24, 12 are network connected computers running standard, off the shelf, electronic mail programs, such as Microsoft Outlook®, Eudora®, Lotus Notes® or the like. Accordingly, in most embodiments of the invention, these will not be part of the system as it is sold, but rather simply the "hardware" required to use the system. However, in embodiments of the system used by governmental or large corporate agencies, these may be included as part of the system.

Finally, the system includes an extracting means 13 that allows the envelope owner to extract a secret message out of the received envelope media data using the embedding-and-extracting key. Again, this means 13 is described in detail below.

In operation, the invention realizes an anonymous covert electronic mailing system in which a secret message may covertly and anonymously pass from a sender to a receiver, without revealing an identity to a third party.

In this electronic mailing system, someone who is ready to receive a secret message (hereafter the "envelope owner") first creates an envelope that is designated to him/herself using the means 11 for creating an envelope. This envelope creation means 11 is an envelope-creating computer program that takes the envelope media data and hides the embedding-extracting key somewhere in the envelope media data. The envelope owner may decide upon a key according to his/her choice; i.e., the key is customizable by the envelope owner, but the owner must not disclose the key information to anyone else. The envelope owner may also hide other optional information to designate the allowable message senders. Such optional information may include a list of the name and electronic mailing address of the persons who are granted permission to embed secret messages in the envelope media data.

The envelope-creating program may utilize any number of fragile information hiding methods to embed the key within the envelope media data. However, the program preferably utilizes a method based upon a steganographic algorithm, such as is disclosed in the inventors' U.S. Pat. No. 6,473,516.

Once the envelope is created, the envelope owner then makes the envelope public for other persons to use. Such publication may include uploading on the Internet. Similarly, the envelope owner may also send it directly to another person who has requested it.

The envelope owner's name and/or electronic mailing address are preferably automatically shown on the outside of the envelope media data during the envelope creation process. This allows the sender to quickly identify whose envelope is being used. Thus, the envelope media data after embedding must be sent only to the envelope owner according to the address shown, preventing the possibility that a third party, C, can create an envelope which looks like person A's on the outside; i.e. having A's name and address, but actually has C's key on the inside. C impersonates A, sending this envelope to B, saying "please insert your message and send it to this other address that is not on the envelope surface", which happens to be C's address, and making some excuse; e.g., on vacation, email server is flaky today, etc. If this were possible, C could open the message intended for A. However, allowing the message to be sent only to the address on the surface of the envelope prevents this scenario. Further, in some embodiments the owner's identity is automatically removed from the envelope media data during the embedding process as an additional security measure.

The message sender embeds a secret message into the envelope media data using the embedding means 22, which is also an embedding computer program that is designed to work with the envelope-creating program described above. When the message sender starts embedding a secret message in the envelope media data, a daemon process of the embedding program automatically discovers the hidden key and conveys it to the message embedding process. In the preferred embodiment, the optional sender-designating information is also transferred to the message-embedding program, which verifies that the message sender's name or electronic mailing address is included in the list and will prevent the message embedding process from starting if the person is not included. When embedding a message, the sender's embedding program uses the envelope owner's key, which is discovered within the envelope media data, to embed the secret message. The secret message embedding process may be based on an algorithm corresponding to the algorithm used by the envelope owner during the envelope creation process, or may be another steganographic algorithm. However, only the system developer knows the details of the particular system being used.

Once the secret message has been embedded, the embedding program then removes the key from the envelope media data. The message sender's personal information, such as the name and electronic mailing address is not shown on the outside of the envelope media data. Rather, it is embedded in the envelope together with the secret message. The message sender may send out the message-embedded envelope either directly to the message receiver, or may ask some other person to forward the message to the designated message receiver. In the case of the forwarded message, the true message sender's information is conveyed to the message receiver only after the receiver has opened the envelope, allowing the message sender to be truly anonymous.

The message receiver, who knows the key used to create the envelope, can easily extract the embedded secret message from the received envelope using the extracting means 13. It is preferred that the extracting means 13 be a message-extracting program that is part of a larger computer program that also includes the means for creating the envelope 11. This is preferred as it allows the program to automatically store the keys used to create various envelopes and to recognize the envelopes, and keys originally embedded therein, upon receipt of the envelope containing the secret message. However, it is understood that this means could take many forms and is not limited to such a program.

Because the intended receiver is the envelope owner and it knows the key that has been used, the receiver can easily open the envelope, and receive the secret message. However, the receiver can extract secret messages only from his/her own receiver-designated envelope and cannot open any other envelopes. Further, because of the ease of creating and using envelopes, different keys may be used for different senders, or for each envelope, allowing the keys to be continually varied. This is an important distinction over present public key/private key systems, as even if one key is discovered it may only be used to decode a single envelope rather than all messages sent to the envelope owner. Therefore, the secret massage is conveyed only to the designated receiver without being eavesdropped by any third party during the communication.

Figure 2:
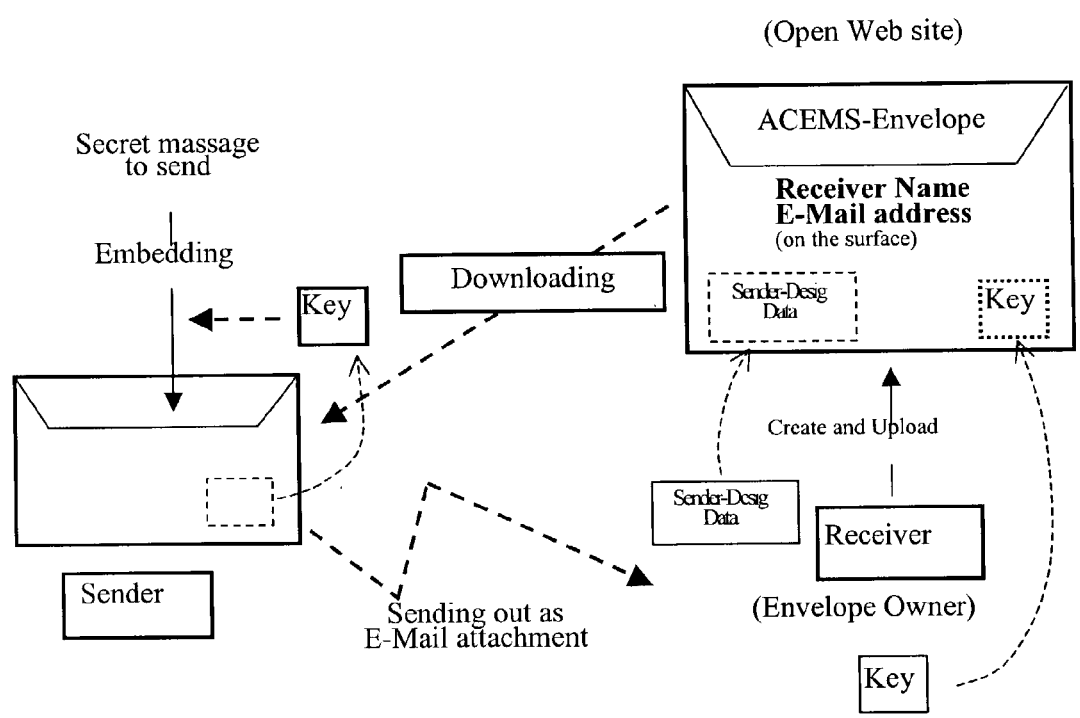
FIG. 2 shows the basic scheme of the ACEMS system according to the present invention.

FIG. 2 illustrates a brief scheme of the system according to the present invention. The message sender acquires the message receiver's envelope, then the message sender's message-embedding program discovers the hidden key from the envelope to embed the secret message in the envelope, and then the message-embedded envelope is sent to the receiver as an attachment to an electronic mail. The message receiver's extraction program opens the envelope by recognizing the envelope, and the corresponding key that was used to create the envelope, and extracting the message from the envelope media data using the key.

Eventually, the present invention realizes an anonymous covert electronic mailing system over the Internet. The message senders and receivers are linked with each other on the Internet via computers and can send and receive electronic mail. It is recognized that a typical computer has a CPU, ROM, RAM, I/O, Image Memory, Keyboard, Mouse, and Display units. However, one should also realize that this is merely an illustration of a typical personal computer with popular elements, and in no way are all of the previously listed elements required for the enablement of the present invention.

An ACEMS described as above may be used in an ordinary company, governmental organization, secret community, by members of a club or other organization. In each case, all the members within one organization use one ACEMS. However, each ACEMS program is customized member by member. First, each member decides upon, or customizes, a key, creates a receiver-designated ACEMS envelope that is personally designated, and makes the envelope public within the organization. If all the members in the organization create and publicize their respective ACEMS envelope, a complete anonymous covert electronic mailing system is realized.

A different organization may use a different, incompatible ACEMS. In this situation there are many different ACEMS' operated in different organizations. However, it is possible for people worldwide to use one unique ACEMS. In such a situation all the people in the world can communicate anonymously and covertly by using that ACEMS, eliminating the need to negotiate about the common key to encrypt/decrypt a secret message.

FIGS. 3-8 illustrate a preferred embodiment of an ACEMS-using organization comprising ACEMS-using members. An ACEMS can be used as an anonymous covert electronic mailing system within an organization having the members M1, M2, . . . , Mi, . . . . Each member in the organization owns an ACEMS-Envelope and sends/receives secret messages to/from other members by using the envelope. Each envelope is hidden with an owner-customized embedding-and-extracting key, and optionally hidden with sender-designating data. Each member M has a unique ACEMS program P consisting of an envelope creating subprogram EC, a message embedding subprogram ME, and a message opening subprogram MO. It is described as $$P=EC,ME,EO.$$

Those subprograms cannot be used separately.

Each member Mi, I=1,2,3 . . . customizes the ACEMS program by setting his/her own personal information, such as name and electronic mailing address, to the program. Mi's customized ACEMS program is described as, $$Pi=ECi,MEi,EOi.$$

Figure 3:
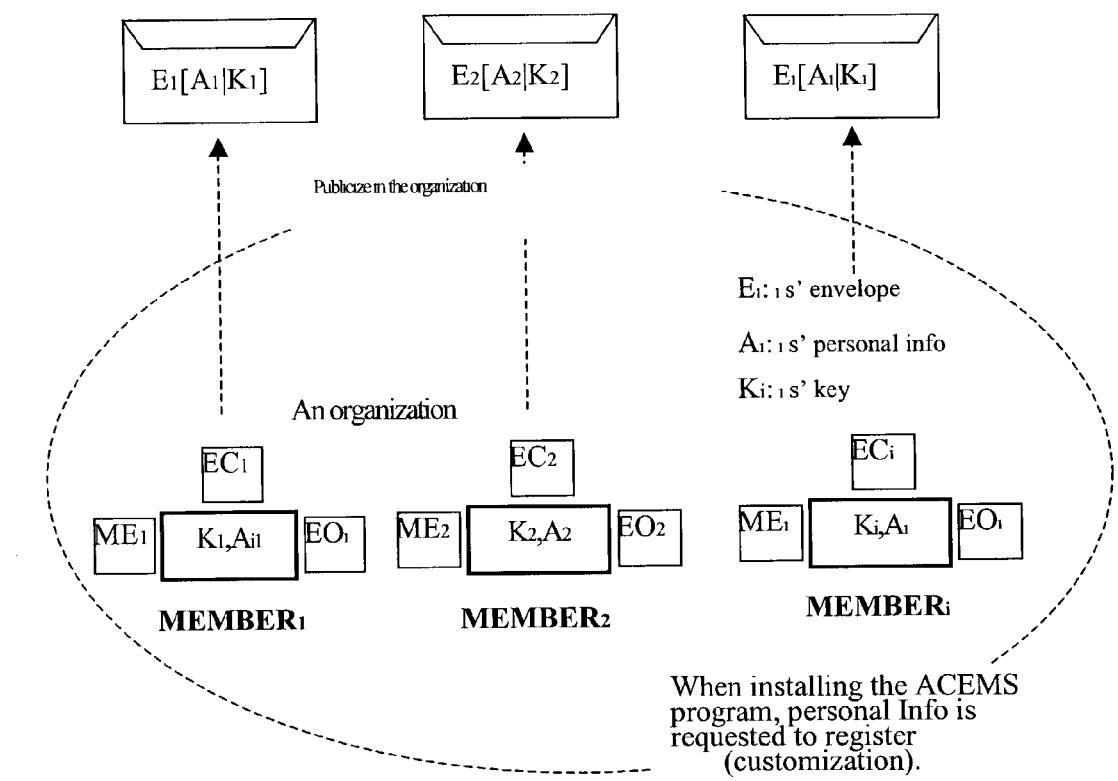
FIG. 3 is a view of an ACEMS using organization and the members.
Figure 7:
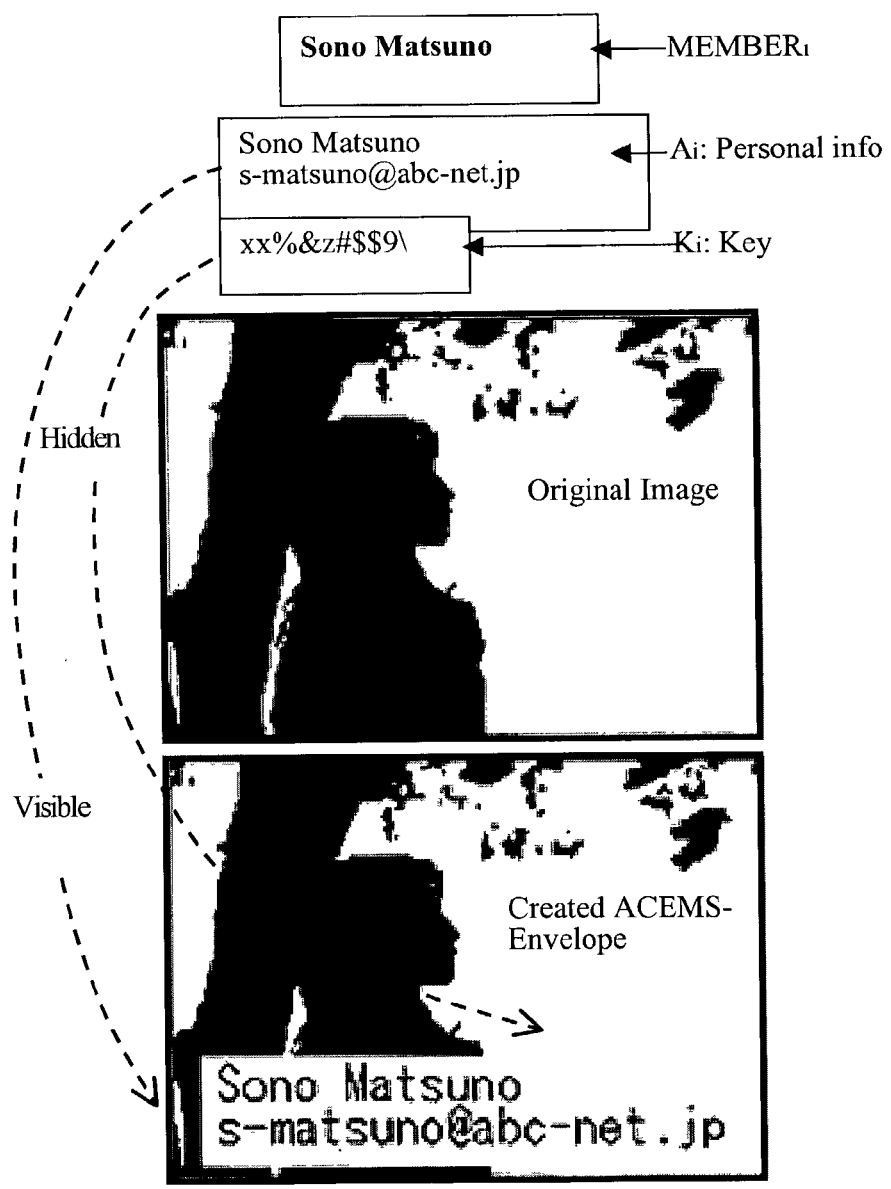
FIG. 7 is a view of an overview of an original image and the created envelope.

ECi stands for Mi's envelope creating subprogram that creates Mi's ACEMS envelope Ei(Ai)(Ki) having an envelope image Ei hidden with Mi's personal information Ai and an embedding-and-extracting key Ki as shown in FIG. 3. Optionally, ECi can also hide some sender-designating data. As shown in FIG. 7, the personal information Ai is shown on the envelope surface, while key Ki is hidden in the inside of the envelope. Optional sender-designating data is also hidden in the inside.

Figure 4:
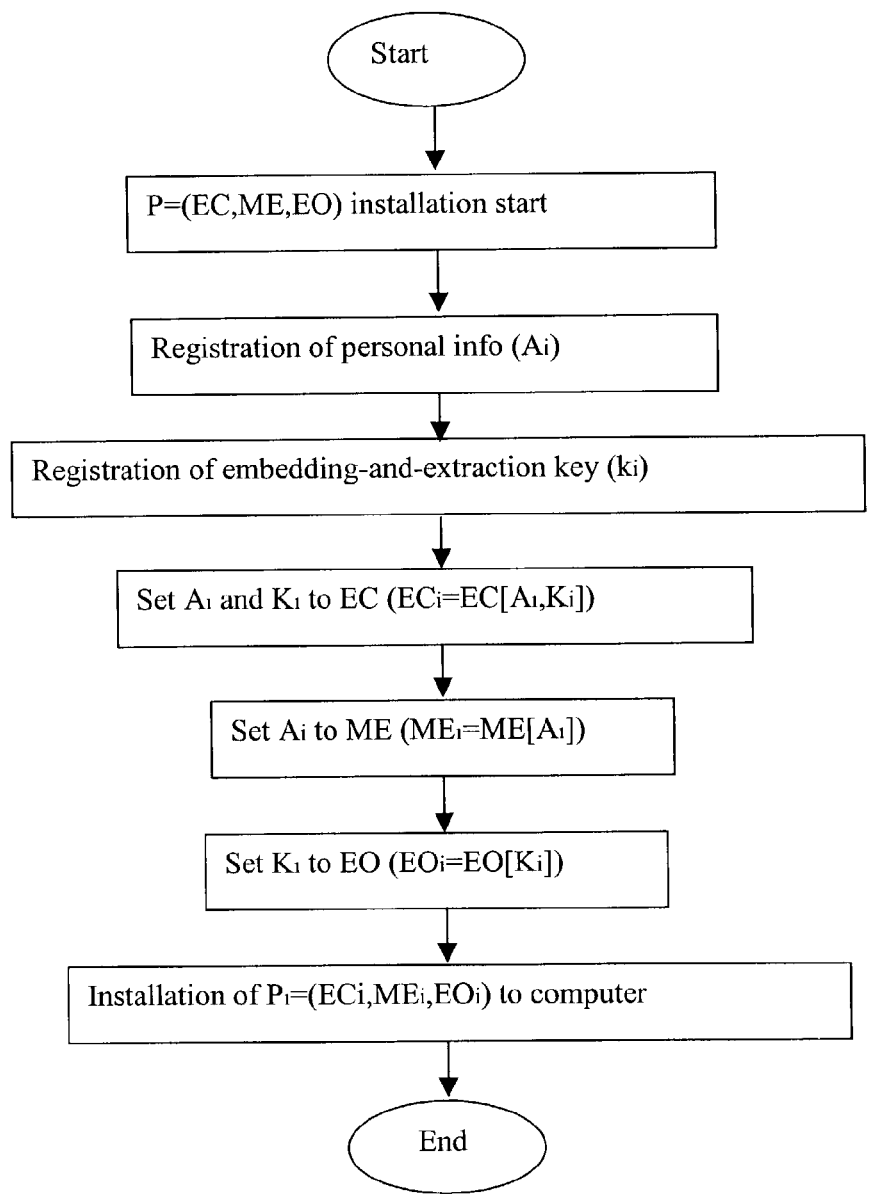
FIG. 4 is a view of an installing process of an ACEMS program.

FIG. 4 shows the customizing and installing procedure of an ACEMS program on a computer. The ACEMS program customization finishes when installed on a computer i.e. Pi is fixed at the time of program installation.

The key-hiding algorithm is the same in principle for all Pi i=1,2,3 . . . . Therefore the hidden keys Ki, i=1,2,3 . . . are always found out according to some key-finding algorithm from all created envelopes. However, this algorithm is not disclosed by any ACEMS system developer.

Mi's ACEMS-Envelope Ei(Ai)(Ki) is publicized in the organization such as on an open Web site. The envelopes can also be delivered directly from Mi upon request.

Figure 5:
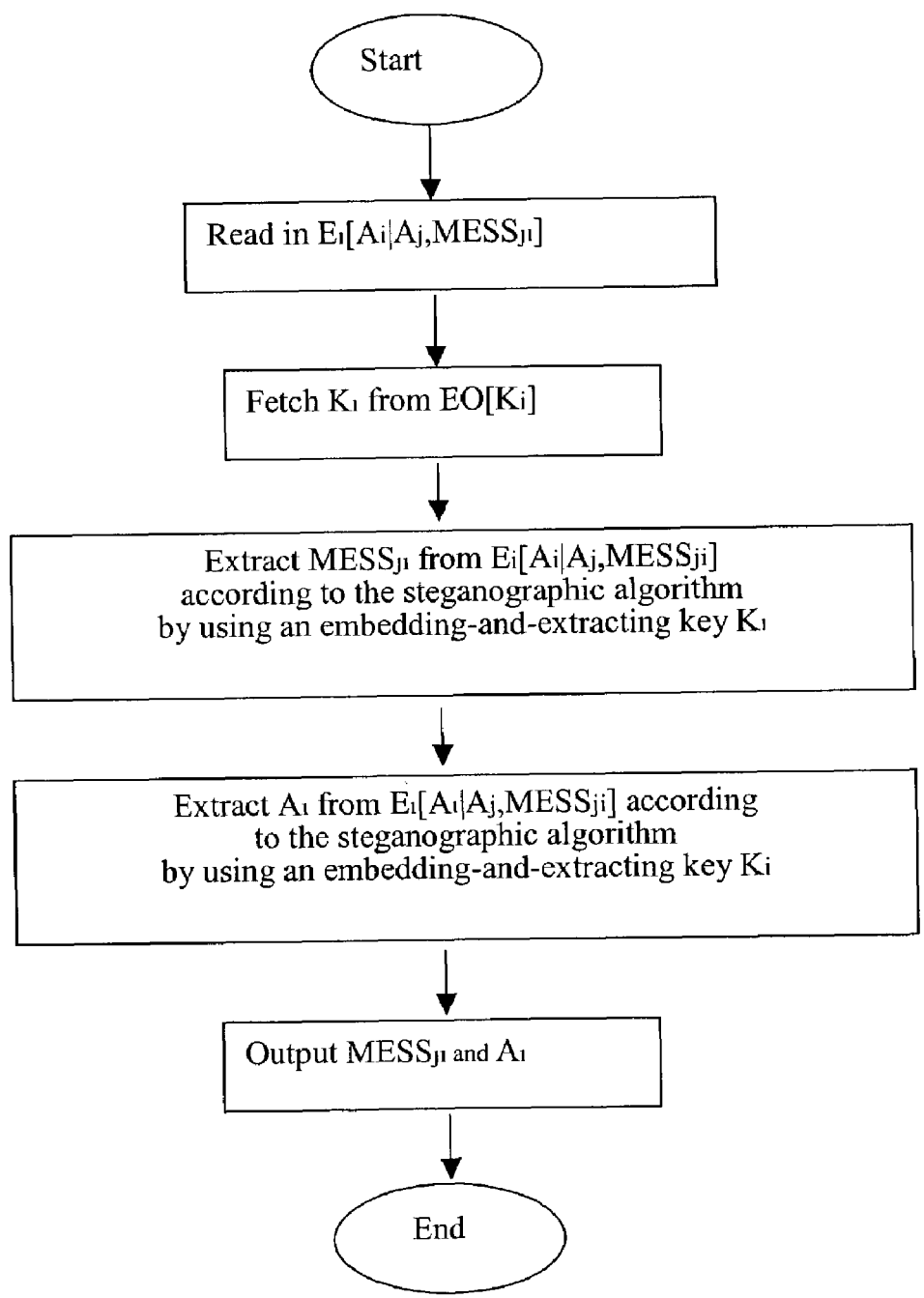
FIG. 5 is a view of the flow of the envelope opening subprogram.
Figure 6:
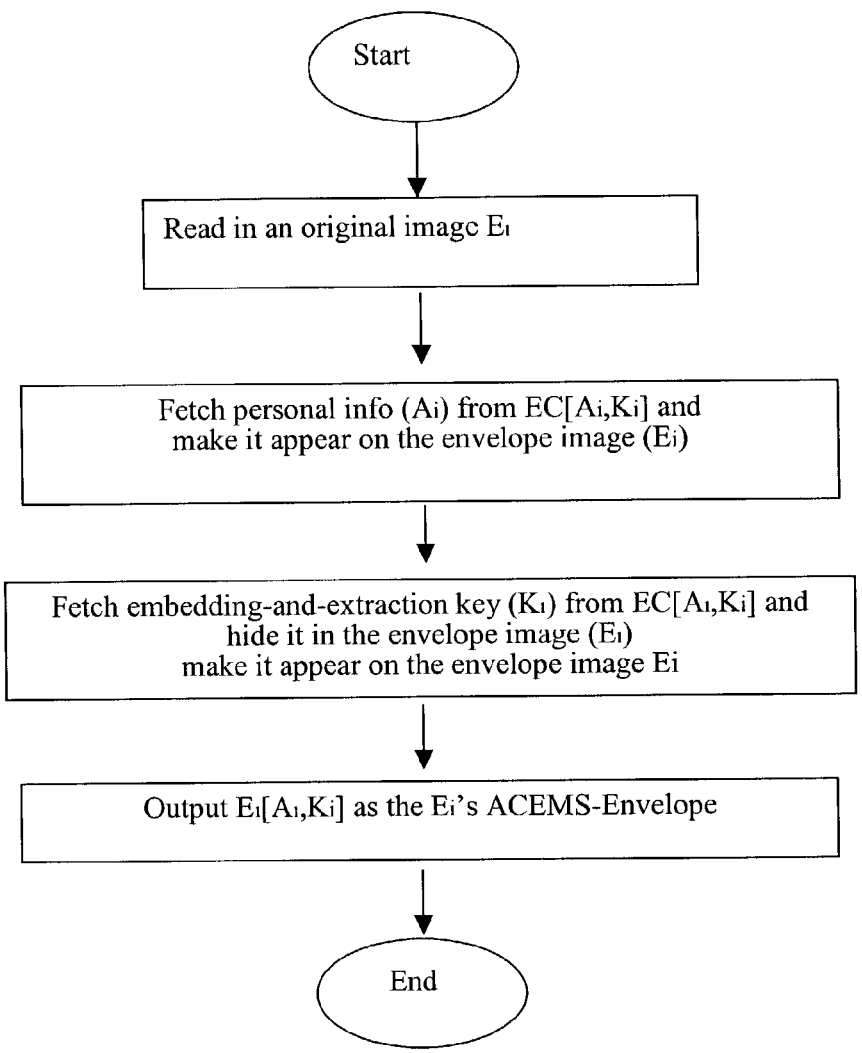
FIG. 6 is a view of the flow of the envelope creating subprogram.
Figure 8:
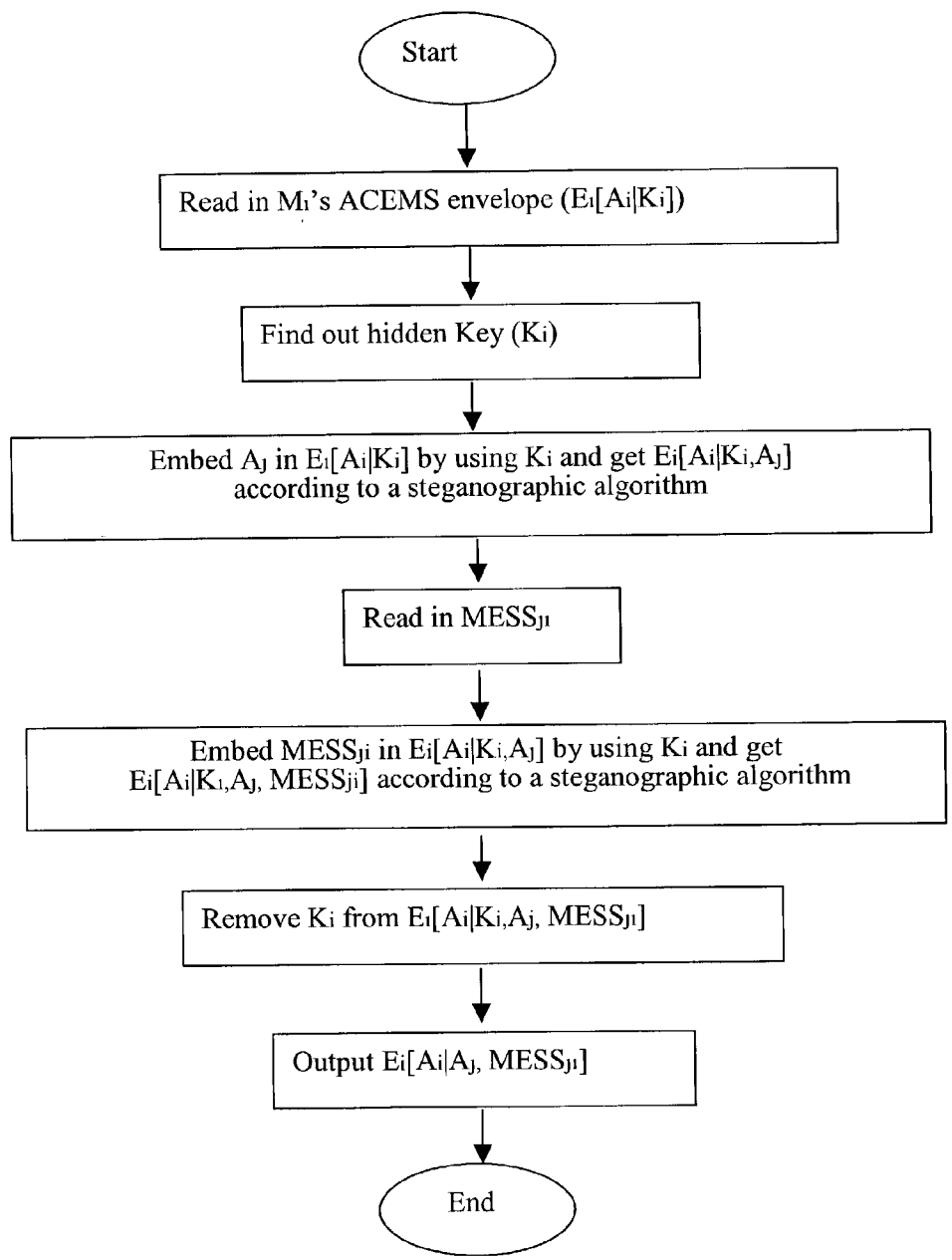
FIG. 8 is a view of the flow of the message embedding subprogram.

FIG. 5 shows the processing flow of the preferred envelope opening subprogram, FIG. 6 shows the processing flow of the preferred envelope creating subprogram, and FIG. 8 shows the processing flow of the preferred message embedding subprogram. These flowcharts are self-explanatory and are not described in detail herein.

Figure 9:
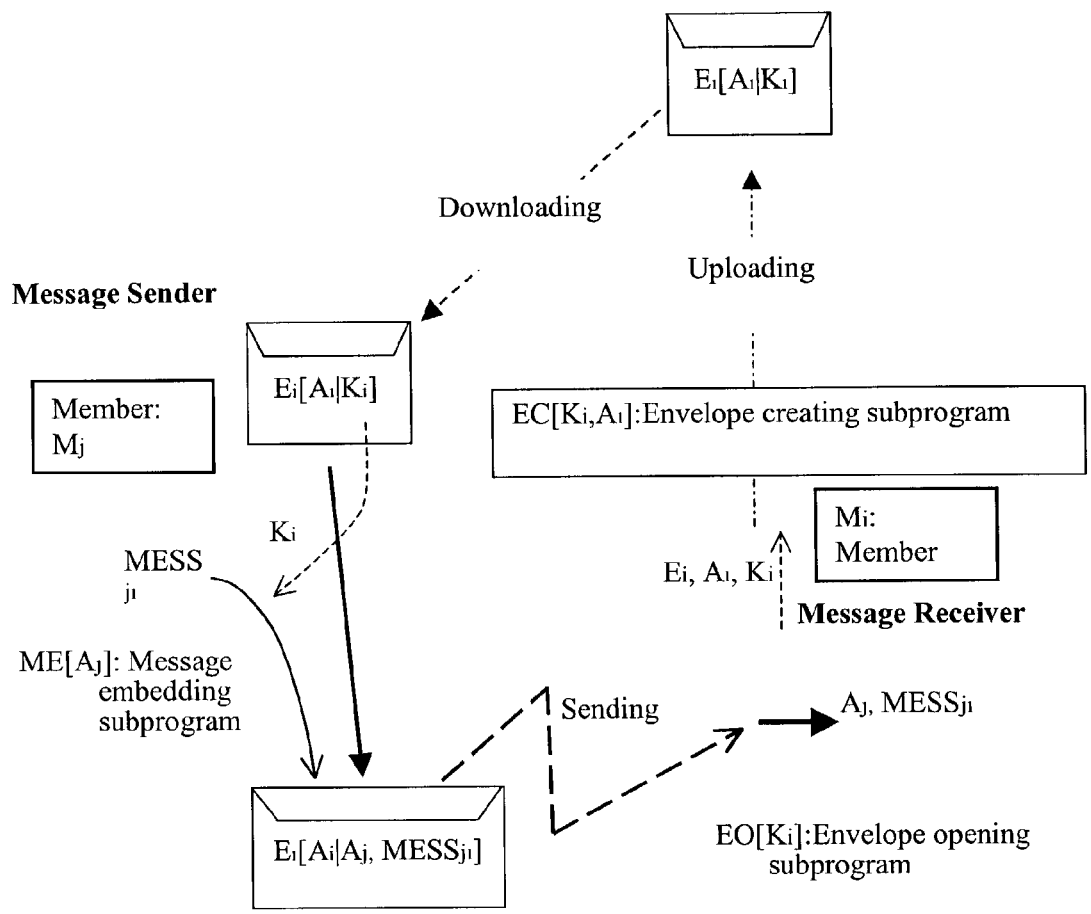
FIG. 9 is a view of the overall system operation of an ACEMS.

FIG. 9 depicts the overall system operation of an ACEMS. When a member Mj in the organization wants to send a secret message to another member Mi, Mj first acquires Mi's envelope Ei(Ai|Ki) by either searching on the Web site or asking Mi directly to deliver. After Mj has received Mi's envelope, Mj embeds a secret message MESSji to Mi in the envelope Ei(Ai|Ki) by using Mj's message embedding subprogram MEj. At this time Mi's key Ki is transferred to MEj in an unnoticed manner. Ki is used for embedding. After the embedding, Ki is removed from the envelope. Mj's personal information Aj is also embedded automatically.

The message embedded envelope Ei(Ai|Aj,MESSji) is sent to Mi as an electronic mail attachment. Mi opens the received envelope by using the envelope opening subprogram EOi. The key Ki has been set to the computer when the ACEMS program was installed. Thus, a secret message from Mj to Mi is securely sent to Mi without any interception in a manner such that each member can open only his/her own envelope.

One concern with any covert message system is the risk of reverse engineering. One step in preventing this from happening is for the ACEMS program to be released from a system developer only in its execution program form as, once the details of the ACEMS scheme details of the system program are made known to the public, someone may be able to steal an embedding-and-extracting key from the ACEMS envelope. Once this happens, the security of ACEMS becomes vulnerable. Therefore, the system developer of an ACEMS should not disclose any source code.

However, even if the source code of the ACEMS is kept secret, someone may try to reverse engineer the execution program to know the source code. Therefore, an ACEMS should be programmed in a reverse-engineering protective way.

In the mean time, computer programmers are always requested to write a program as short as possible, as simple as possible, and as structured as possible to make it understandable to other programmers. Such programs, however, might be less, difficult to reverse engineer. So, the ACEMS program should be written in a difficult-to-understand manner to protect against reverse engineering.

The following techniques are general methods to make a program difficult to reverse engineer, but many other techniques exist:

(1) To make the flow of the program a very tangled one by adding many indifferent program pieces and then scrambling the whole program. A program that is very tangled in the flow is called a spaghetti program.

(2) To insert as many long and difficult-to-trace mathematical subroutines as possible in the core program and make it practically impossible to trace them by hand.

(3) To insert as many conditional branch points as possible where the conditions are not algorithmically related to the local computation conditions such as computation times between two program steps.

(4) To combine techniques 1 through 3 and place many "never recovering" traps in the wrong branches.

Computer speed is always increasing. Modem computers can execute a very large number of program steps in a very short time. So, it is becoming much easier for experienced programmers to make a difficult-to-trace program that has a large number of program steps but runs in a very short time, that eventually makes reverse engineering attempts virtually impossible.

Meanwhile, in the case of cryptography, the faster the computer speed becomes, the easier the cryptanalysis becomes. It eventually puts cryptographic systems in a rat race between the crypto-engineers and the hackers. However, the system of the present invention makes it more difficult for hackers, as the users may choose to use different private keys for each message that is sent. Thus, even if one envelope is downloaded or intercepted and the key decrypted, that key will only allow the hacker to open a limited number of messages. Conversely, as noted above, were a hacker to gain access to a user's private key in a public key/private key system, the hacker would be able to intercept and access all messages sent to the user.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A computer readable medium comprising a computer program product stored on said computer readable medium, said computer program product comprising:

an envelope creation means for creating an envelope comprising envelope media data and an embedding-and-extracting key hidden within said envelope media data, wherein said envelope creation means hides said embedding-and-extracting key within said envelope media data using a steganographic method;

an embedding means for embedding a secret message into said envelope media data using said embedding-and-extracting key and for removing said embedding-and-extracting key from an embedded envelope, wherein said embedding means utilizes a steganographic method to embed said secret message within said envelope media data; and an extracting means for extracting said secret message from said embedded envelope using said embedding-and-extracting key.

2. The computer readable medium as claimed in claim 1 wherein said envelope creation means further comprises means for inserting personal information into said envelope media data such that said personal information is not hidden within said envelope media data.

3. The computer readable medium as claimed in claim 1 wherein said envelope media data is chosen from a group consisting of image data and acoustic data.

4. The computer readable medium as claimed in claim 1, wherein said computer program product further comprises an acquisition means for a message sender to acquire said envelope.

5. The computer readable medium as claimed in claim 1 wherein said envelope creation means, said embedding means, and said extracting means are computer subprograms that are part of a main computer program.

6. The computer readable medium as claimed in claim 1 wherein said envelope creation means further comprises means for embedding sender data corresponding to at least one authorized message sender.

7. The computer readable medium as claimed in claim 6 wherein said embedding means further comprises means for sending said sender data and determining whether a message sender is an authorized message sender.

8. The computer readable medium as claimed in claim 1 wherein said embedding means further comprises means for embedding sender data within said envelope media data.

9. An electronic mailing system comprising:
   a plurality of computers, wherein each of said plurality of computers corresponds to a member of an organization;
   an electronic network system to which each of said plurality of computers is linked;
   an envelope creation means for allowing each member to create an envelope, said envelope comprising envelope media data and a hidden embedding-and-extracting key, wherein said envelope creation means hides said embedding-and-extracting key within said envelope media data using a steganographic method;
   a storage means for each member to store said envelope on said electronic network system;
   an acquisition means for each member to acquire envelopes created by other members through the electronic network system;
   an embedding means for discovering said embedding-and-extracting key that is hidden within said envelope media data, embedding a secret message in said envelope media data using the embedding-and-extracting key, and for removing said embedding-and-extracting key from said envelope media data to create an embedded envelope, wherein said embedding means utilizes a steganographic method to embed said secret message within said envelope media data;
   a sending means for sending said embedded envelope through the electronic mailing system;
   a receiving means for receiving said embedded envelope through the electronic mailing system; and
   an extracting means for extracting said secret message out of said embedded envelope.

10. An electronic communication method to allow an envelope creator to receive a secret message from a message sender, said method comprising the steps of:
   creating an envelope comprising envelope media data and an embedding-and-extracting key hidden within said envelope media data, wherein said creating step comprises hiding said embedding-and-extracting key within said envelope media data using a steganographic method;
   allowing the message sender to acquire said envelope;
   embedding a secret message into said envelope media data of said envelope using said embedding-and-extracting key, wherein said embedding step comprise embedding said secret message into said envelope media data using a steganographic method;
   removing said embedding-and-extracting key from said envelope to form an embedded envelope;
   sending said embedded envelope to said envelope creator; and
   extracting said secret message from said embedded envelope using said embedding-and-extracting key.

11. The method as claimed in claim 10 wherein said creating step further comprises inserting personal information into said envelope media data such that said personal information is not hidden within said envelope media data.

12. The method as claimed in claim 10 wherein said creating step further comprises embedding sender data corresponding to at least one authorized message sender within said envelope media data.

13. The method as claimed in claim 12 wherein said embedding step further comprises the step of reading said sender data and determining whether a message sender is an authorized message sender.

14. The method as claimed in claim 10 wherein said embedding step further comprises embedding sender data within said envelope media data.

* * * * *